United States Patent [19]

Johnson et al.

[11] 3,891,795

[45] June 24, 1975

[54] AUTOMATIC DAY-NIGHT TELEVISION SURVEILLANCE SYSTEM

[76] Inventors: Quentin S. Johnson, 703 W. Nettletree Rd., Sterling, Va. 22170; Edward H. Pignone, 2537 Villanova Dr., Vienna, Va. 22180

[22] Filed: Apr. 11, 1974

[21] Appl. No.: 460,089

[52] U.S. Cl. ........................... 178/7.2; 178/DIG. 29

[51] Int. Cl. ............................................. H04n 5/38

[58] Field of Search ....... 178/7.2, DIG. 29, DIG. 21, 178/DIG. 38

[56] References Cited

UNITED STATES PATENTS 3,748,383 7/1973 Grossman ........................... 178/7.2

*Primary Examiner*—Richard Murray

*Attorney, Agent, or Firm*—Lane, Aitken, Dunner & Ziems

[57] ABSTRACT

An automatic day-night, closed circuit, remotely controlled television surveillance system employing a daylight vidicon or orthicon television camera. The camera is automatically and selectively placed in optical alignment with either a day-viewing optical system or a night-viewing optical system by a photocell, switching relay, rotary solenoid arrangement operating to position a rotatable mirror which, in conjunction with a pair of fixed mirrors and field lenses, directs the viewed scene image to the camera from one of the optical systems as a function of average scene illumination.

10 Claims, 2 Drawing Figures

AUTOMATIC DAY-NIGHT TELEVISION SURVEILLANCE SYSTEM

BACKGROUND OF THE INVENTION

This invention relates to a television surveillance system and more particularly, it concerns a unique apparatus by which the capability of a remotely controlled television surveillance system employing a conventional camera tube may be extended into a region of very low scene illumination levels without reducing or otherwise affecting the capability of the television camera to image and transmit pictures at high illumination levels.

Television surveillance systems which are positioned to monitor a scene both during the daytime and during the nighttime must be capable of producing a usable image over a range of scene illumination levels which may vary from $10^{-5}$ ft-candles to $10^{4}$ ft-candles. Presently available television surveillance systems conventionally employ television cameras having objective lens and aperture configurations designed for either low or high scene illumination levels. Surveillance installations designed for very low scene illumination levels, such as $10^{-3}$ ft-candles or less, characteristically employ a special camera tube designed specifically for this low range of scene illumination levels. These special camera tubes are relatively costly and further are essentially unusable at high scene illumination light levels, such as might be encountered during daytime viewing.

The use of a closed circuit, television surveillance system having a single camera designed for low-scene illumination levels presents various problems especially when the unit is positioned a long distance from a monitoring station such as at a building entrance, parking lots, a museum showroom, or in remote areas of a manufacturing plant. For example, this type of camera may have its transmitted image drowned out or the tube damaged by aiming a high intensity, red-filter flashlight at the lens, by automobile headlights momentarily illuminating the scene, or by other artificial light sources which may be positioned within the unit's field of view.

During any of these possible occurrences, the transmitted image from such a specially designed television camera may be temporarily or permanently lost at the monitoring station. If the station is a long distance from the area under surveillance, intruders would be able to carry out their activities before a security guard or force could reach the scene.

It can be seen therefore that available television cameras designed for very low scene illumination levels are not fully acceptable even for night-viewing surveillance and are incapable of functioning up to the high scene illumination levels which may be encountered during the daytime. These shortcomings of available night-viewing television cameras necessitate the use of two separate cameras at each surveillance installation to cover the wide range of scene illumination levels which may be encountered, i.e., one camera employing a special camera tube for low scene illumination levels and another camera employing a conventional vidicon or orthicon tube for normal or high scene illumination levels.

A system of this type, employing two separate television cameras, while capable of monitoring the entire range of scene illumination levels which may be encountered poses various problems. For example, because two complete television cameras employing separate optics must be provided, the resulting unit suffers from relatively large size or bulkiness, relatively high weight, and further requires double maintenance on two separate camera systems. Also, these systems tend to be relatively expensive when compared to a closed circuit surveillance unit designed for only day viewing operation or a single closed circuit television surveillance unit designed for only night-viewing surveillance operation. In fact, this relatively high dollar value of a two camera unit results in the surveillance system itself becoming attractive to intruders.

SUMMARY OF THE INVENTION

In accordance with the present invention, an improved apparatus is provided by which a single conventional television camera may be employed to transmit usable television pictures from a remote surveillance installation at all anticipated scene light levels. Essentially, a conventional vidicon or orthicon type television camera is provided with the necessary extended capability by combining the standard television camera with a night-viewing instrument such as an image intensifier device and a day-viewing optical system. The camera, night-viewing instrument, and day-viewing optical system are mounted within a compact housing with the optical axis of the camera coupled to the optical axis of the night-viewing instrument or the day-viewing optical system through a folded optical path and a photoelectrically controlled mirror serving to switch the camera optical path automatically to view the scene either through the daylight system, or to view the scene as the output image of the night-viewing instrument depending upon the level of scene illumination at the instant of viewing. The switching mechanism employs a photoelectric cell for sensing an average scene illumination and for transmitting an electrical signal to a driving means for a rotatable mirror, thereby to align the optical axis of the television camera with either the day-viewing optical system or the night-viewing instrument. Two stationary mirrors and two field lenses are provided to "fold" the optical paths of the viewing devices in order to provide a compact system. Further, provision is made for automatically deactivating the night-viewing instrument when the scene illumination levels sensed by the photocell are high enough to place the television camera in optical alignment with the day-viewing optical system, thereby minimizing the power drain on the surveillance system and maximizing the life of the night-viewing instrument. Further, the unit enclosure may be mounted on an auxiliary servo-driven pan-and-tilt head thereby permitting an operator at a remote monitoring station to observe any predetermined area about the surveillance station without concern for scene illumination levels.

Among the objects of the present invention therefore are: the provision of an improved television camera surveillance system by which a conventional daylight television camera is provided with the capability of viewing all anticipated scene light levels; the provision of such a system which is simple, lightweight, compact and of relatively low cost; the provision of an improved television surveillance system having the capability of automatic day-night operation; the provision of remote control operation from a remote central monitor station; the provision of a remote television camera surveillance system capable of transmitting usuable television pictures at all anticipated scene light levels responding automatically without loss of picture at the monitor; and the provision of an improved automatic day-night closed circuit television surveillance system of the type referred to by which the problems heretofore experienced with systems employing a double or single camera arrangement are substantially alleviated.

DETAILED DESCRIPTION OF THE PREFERRED EMBODIMENT

Figures 1, 2:
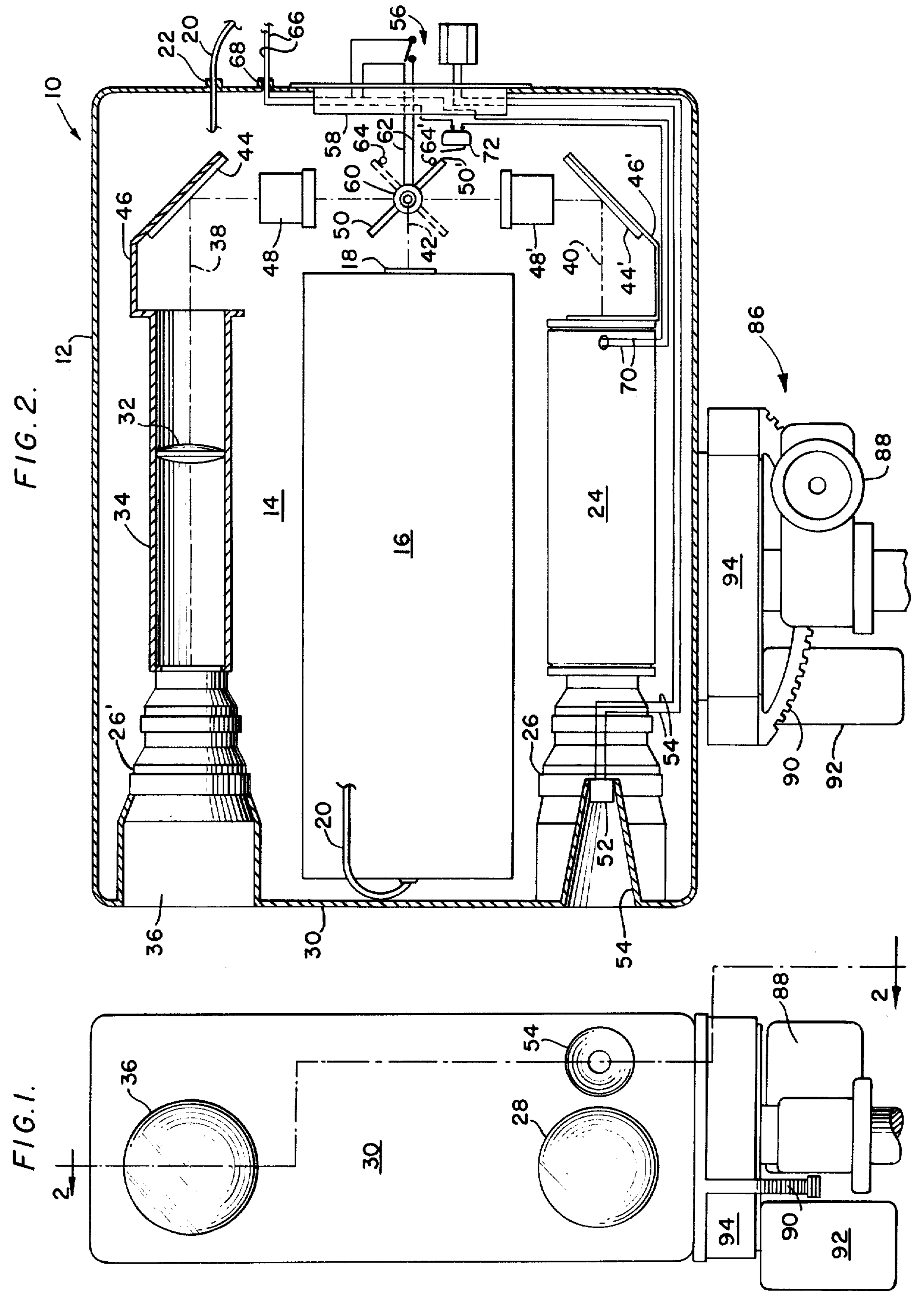
FIG. 1 is a front view of a preferred form of an automatic day-night television surveillance system in accordance with the present invention.
FIG. 2 is a cross-section taken on lines 2—2 of FIG. 1.

The preferred embodiment of an automatic day-night television camera surveillance system in accordance with this invention is illustrated in FIGS. 1 and 2 of the drawings and designated generally by the reference numeral 10. As seen in the drawings, the surveillance system includes a housing 12 defining a support chamber 14 within which is disposed a television camera 16 using a conventional camera tube (not shown) such as a vidicon or orthicon type having a photosensitive image receiving surface 18. The television camera 16 is operatively connected to a remotely positioned monitoring or control station (not shown) by a cable 20 which penetrates the housing 12 at an opening 22. A night-viewing instrument 24 such as an image-intensifier which is well known in the art and may be of the type manufactured by Aspheronics, Inc., and sold under the tradename SCOTOS-I, is also mounted within the chamber 14. The night-viewing instrument 24 is provided with an objective lens 26 positioned at an opening 28 formed on the front wall 30 of the housing 12.

A day-viewing optical system including an objective lens 26′ and a field lens 32 disposed within a tubular housing 34 is also supported within the system housing 12. The objective lens 26′ of the daylight viewing system is positioned at an opening 36 formed in the front wall 30 of the system housing 12.

As illustrated in FIG. 2, the optical axis 38 of the daylight viewing system and the optical axis 40 of the night-viewing instrument are parallel to the viewing axis 42 of the camera 16 with the television camera "looking" in a direction opposite to that of a night-viewing instrument and the day-viewing optical system.

The optical paths of the day-viewing optical system and the night-viewing instrument are folded by positioning stationary mirrors 44 and 44′ on mounts 46 and 46′, respectively, behind each viewing device at an angle of 45° with respect to the optical axes of the day-viewing and night-viewing systems, in order to reflect the corresponding optical image through a pair of relay lenses 48 and 48′, respectively. A rotatable mirror 50 is positioned directly in front of the camera objective 18 of the television camera 16 and serves to selectively reflect the image transmitted by either the day-viewing optical system or the night-viewing instrument depending upon the scene illumination level to the camera objective 18.

An automatic system is provided for controlling the position of the rotatable mirror 50. This system includes a photosensitive element such as a photocell 52 disposed within a frustro-conical shaped portion 54 formed in the housing wall 30 adjacent to the objective lens 26 of the night-viewing instrument 24. This photocell 52 serves to sense the average scene illumination level and transmits a corresponding signal through wires 54 to a conventional switching relay indicated schematically at 56 mounted on a terminal panel 58. The switching relay which is turned "on" or "off", depending upon the level of scene illumination sensed by the photocell 52, serves to actuate or deactuate a one-way, spring returned, rotary solenoid 60 to which it is electrically connected by wires 62. The rotary solenoid 60 rotates the movable mirror 50 and positions it against stops 64 or 64′ to thereby place the camera objective 18 into optical alignment with either the day-viewing optical system or the night-viewing optical system as a function of the scene illumination level.

The switching relay 56 and photocell 52 are matched so that a lag exists between the illumination level which switches the relay 56 off at which the system is placed in the night-viewing mode and the illumination level which switches the relay 56 on at which the system is placed in the day-viewing mode. Such a matched photocell and switching relay design serves to reduce any tendency by the system to "hunt" during rapid changes in scene illuminataion levels.

This designed in "lag" is obtainable from conventional switching relays. For example, a solenoid-type switching relay requires a higher voltage level from an illumination level sensor which produces a voltage output, before the relay will switch on than is necessary to maintain the relay in the on condition. Therefore by proper matching of the photosensitive element 52 and switching relay 56, during periods of increasing scene illumination levels, a specific illumination level may be selected at which the system will switch to the day-viewing mode. This specific illumination level will be higher than the level at which the relay will switch off with the system changing to a night-viewing mode during periods of decreasing scene illumination levels.

Power is supplied to the terminal panel 58 to actuate the solenoid 60 through the switching relay 56 and to power the night-viewing instrument 24 by a cable 66 which penetrates the housing 12 at an opening 68.

The night-viewing instrument is electrically connected to the terminal panel through a circuit 70 which includes a micro switch 72. The micro switch is activated or deactivated depending upon the position of the rotatable mirror 50. The mirror 50 is provided with an extension 50′ which when the mirror is positioned to direct the image transmitted by the night-viewing instrument to the camera objective 18, actuates the micro switch 72 thereby activating the night-viewing instrument 24. This feature results in power being supplied to the night-viewing instrument only when the surveillance system is in the low-level illumination viewing mode and thereby decreases the power drain of the system and increases the life of the night-viewing instrument.

The night-viewing instrument preferably is capable of transitting a usuable image to the tube of the television camera 16 at scene illuminations as low as $10^{-5}$ ft-candles while the day-viewing optical system is capable of transmitting an optical image to the television camera 16 at illumination levels as high as $10^4$ ft-candles.

In operation, when the scene being viewed falls to an average brightness of about 0.20 ft-lamberts (0.40 ft-candle illuminations of an average 50 percent reflectance scene), the output signal of the photocell 52 is such that the relay 56 is switched off and the rotatable mirror 50 is rotated to the position shown in solid lines in FIG. 2 by the now deactivated spring loaded rotary solenoid. The extension 50' contacts the micro switch 72 and turns on the image intensifier 24. As a result, the image transmitted by the night-viewing system will be reflected by the mirror 50 to the camera objective 18 of camera 16 along the optical axis 52.

It is preferred that the system continue in this night-viewing mode until the average scene brightness as sensed by the photocell 52 increases to about 0.50 ft-lamberts (1.0 ft-candle illumination of an average 50 percent reflectance scene). At this scene illumination level, the switching relay 56 is switched on thereby activating the solenoid 60 and rotating mirror 50 to the position shown in dotted lines in FIG. 2. In this position, the mirror 50 reflects the image from the day-viewing optical system to the camera objective 18 of the camera 16.

It is preferred that this will remain the mode of operation until the scene illumination level again drops to 0.20 ft-lamberts when the automatic control system switches to a night-viewing mode.

The purpose of this preferred designed in "lag" is to permit rapid responses by the system to changing scene illumination levels without any tendency by the system to hunt.

The housing 12 is preferrably an hermetically sealed enclosure and the system may be powered by a 115-volt, 60 cycle AC source. By supporting the system elements within a sealed enclosure 12, the system may be mounted on a rigid base or alternatively, as shown in FIG. 2, the system may be mounted on a servo-driven, remote controlled pan-and-tile mechanism, generally designated 86. The pan-and-tile mechanism may include a conventional tilt control motor 88 operatively driving a sector gear 90 to provide a tilt angle of up to 180° in elevation. An azimuth control motor 92 may be provided to drive a ring gear (not shown) mounted within a housing 94 to provide a sweeping motion of up to 360° in azimuth. By providing the television surveillance system with this option, an operator at a remote, central monitoring station will be able to position the television system to any 360° × 180° direction which when coupled with the automatic day-night viewing capability permits such sweeping without concern for wide variance in artificial or natural illumination which so profoundly affect conventional low-light-level television surveillance systems.

Should the television surveillance system be mounted on a stationary base, it is preferred that the objective lenses 26 and 26' be of a type having a 24° field of view. Alternatively should the system be mounted on a servo-driven remote control pan-and-tilt mechanism 86, it is preferred that the objective lenses 26 and 26' be of the type having a 14° field of view thereby providing a capability whereby an operator at a remote central monitoring station could direct the field of view of the system in any horizontal direction within a 194° vertical viewing zone.

It is envisioned that the automatic day-night television surveillance system described above will be incorporated in a system whereby a plurality of such surveillance units having automatic day-night capability will be positioned at various locations and equipped to transmit their received images to a central monitoring station which would ideally consist of a single viewing unit, a control console, and an auxiliary tape unit to record desired image sequences at any camera station.

Thus it will be appreciated that the present invention provides an automatic day-night television camera surveillance system of compact size, low weight, and relative low cost when compared with the simplest combination of a daytime and low-light-level television surveillance camera arrangement. Further, the system of the present invention contains no complex optical, mechanical or electrical subsystems, it is capable of delivering usable images despite variations in scene illumination of over one billion times and despite rapid temporal and spatial scenebrightness fluctuations. It is expressly intended, therefore, that the foregoing description is illustrative of the preferred embodiment only, not limiting, and that the true spirit and scope of the present invention will be determined by reference to the appended claims.

We claim:

1. A closed circuit television surveillance system for night-viewing at scene illumination levels as low as $10^{-5}$ ft-candles and day-viewing at scene illumination levels as high as $10^4$ ft-candles, capable of automatically switching between a night-viewing mode and a day-viewing mode, and having a single daylight television camera receiving a scene image along a viewing axis, comprising:

a night-viewing optical system including an image intensifier and a first objective lens disposed at one end of said image intensifier for receiving and transmitting the image along a first optical axis;

a day-viewing optical system including, in optical alignment, a second objective lens and a field lens for receiving and transmitting the image along a second optical axis;

aligning means for automatically and selectively placing one or the other of said optical systems in optical alignment with the viewing axis of the daylight television camera depending upon the average scene illumination level thereby to adapt the system for day or night viewing; and means for supplying power to said image intensifier and said aligning means.

2. The closed circuit television surveillance system as defined in claim 1, wherein said aligning means comprises:

a rotatable mirror positioned to intersect the viewing axis of the daylight television camera;

a first mirror disposed behind said night-viewing optical system, said first mirror intersecting the first optical axis at an angle of 45°;

a first relay lens disposed between said first mirror and said rotatable mirror for receiving the image reflected by said first mirror and transmitting the image to said rotatable mirror;

a second mirror disposed behind said day-viewing optical system, said second mirror intersecting the second optical axis at an angle of 45°;

a second relay lens disposed between said second mirror and said rotatable mirror for receiving the image transmitted by said day-viewing optical system and reflected by said second mirror and transmitting the image to said rotatable mirror; and means operatively connected to said rotatable mirror for automatically and selectively rotating said rotatable mirror to reflect the image transmitted by one of said optical systems to the television camera depending upon the average scene illumination level.

3. The closed circuit, television surveillance system as defined in claim 2, wherein said automatic and selective rotating means comprises:

a photosensitive element for sensing an average scene illumination level and generating a control signal;

stop means for limiting rotation of said rotatable mirror between a first position and a second position;

a solenoid operatively connected to said rotatable mirror for rotating said mirror between said first position wherein the image received by said first relay lens is reflected to the television camera and said second position wherein said image received by said second relay lens is reflected to the television camera; and a switching relay electrically connected to said photosensitive element, said solenoid, and said power supply means whereby said rotary mirror is placed in said first position when the average scene illumination level is less than or equal to 0.20 ft-lamberts and in said second position when the average scene illumination is greater than or equal to 0.50 ft-lamberts, said rotatable mirror staying in said second position until the average scene illumination level is again less than or equal to 0.20 ft-lamberts.

4. The closed circuit television surveillance system as defined by claim 3, further comprising:

a micro switch electrically connected to said image intensifier and said power supply means; and means connected to said rotatable mirror for activating said micro switch when said mirror is in said first position whereby the image intensifier is operative only when the surveillance system is in the night-viewing mode.

5. A closed circuit television surveillance system for night-viewing at scene illumination levels as low as $10^{-5}$ ft-candles and day-viewing at scene illumination levels as high as $10^4$ ft-candles, capable of automatically switching between a night-viewing mode and a day-viewing mode, comprising:

a housing defining a support chamber, said housing having formed in one wall thereof a first opening, a second opening, and a third opening;

a daylight television camera for receiving an image along a viewing axis, said viewing axis extending from said camera objective in a direction opposite from said housing wall having said first, said second, and said third openings;

a night-viewing optical system including an image intensifier in optical alignment with an objective lens, said objective lens supported in said first opening formed in the wall of said housing, said night-viewing optical system receiving and transmitting an image along a first optical axis which is parallel to the viewing axis of said camera objective;

a day-viewing optical system including an objective lens in optical alignment with a field lens, said objective lens supported in said second opening formed in said housing, said day-viewing optical system receiving and transmitting an image along a second optical axis which is parallel to said viewing axis of said camera objective;

a first mirror supported in said housing behind said night-viewing optical system and intersecting said first optical axis at an angle of 45°;

a first relay lens supported in said housing for receiving and transmitting the image reflected by said first mirror;

a second mirror supported in said housing behind said day-viewing optical system and intersecting said second optical axis at an angle of 45°;

a second relay lens supported in said housing for receiving and transmitting the image reflected by said second mirror;

means mounted within said housing for automatically and selectively aligning the television camera objective with one of said relay lenses depending upon the average scene illumination level viewed to thereby adapt the system for day or night viewing; and means for supplying power to said image intensifier and said aligning means.

6. A closed circuit, television surveillance system as defined in claim 5 wherein said aligning means comprises:

a photosensitive element for sensing an average scene illumination level and generating a control signal, said photosensitive element supported in said third opening formed in the wall of said housing;

a mirror rotatably mounted in said housing said rotatable mirror intersecting the viewing axis of the camera objective;

stop means for limiting rotation of said rotatable mirror between a first position and a second position;

a solenoid operatively connected to said rotatable mirror serving to rotate said mirror between a first position wherein the image transmitted by said first relay lens is reflected to said camera objective and a second position wherein said image transmitted by said second relay lens is reflected to said camera objective; and a switching relay electrically connected to said photosensitive element, said rotary solenoid and said power supply means whereby said rotary mirror is placed in said first position when the average scene illumination level is less than or equal to 0.20 ft-lamberts and in said second position when the average scene illumination level is greater than or equal to 0.50 ft-lamberts, said rotatable mirror staying in said second position until the average scene illumination level is again less than or equal to 0.20 ft-lamberts.

7. The closed circuit television surveillance system as defined in claim 6, further comprising:

a micro switch electrically connected to said image intesifier and said power supply means; and means connected to said rotatable mirror for activating said micro switch when said mirror is in said first position whereby said image intensifier is operative only when the television surveillance system is in the night-viewing mode.

8. The closed circuit television surveillance system as defined in claim 7, wherein said first and second objective lenses have a 24° field of view.

9. The closed circuit television surveillance system as defined in claim 7, further comprising:

means connected to said housing for tilting said housing through a tilt angle of 90° and sweeping said housing through an azimuth angle of 180°.

10. The closed circuit television surveillance system as defined in claim 9, wherein said first and second objective lenses have 14° field of view.

* * * * *